(12) United States Patent
Nguyen

(10) Patent No.: US 8,223,229 B2
(45) Date of Patent: Jul. 17, 2012

(54) LENS SHADING CORRECTION FOR AUTOFOCUS AND ZOOM LENSES

(75) Inventor: Hugh Phu Nguyen, San Jose, CA (US)

(73) Assignee: Nethra Imaging Inc, Santa Clara, CA (US)

( * ) Notice: Subject to any disclaimer, the term of this patent is extended or adjusted under 35 U.S.C. 154(b) by 334 days.

(21) Appl. No.: 12/496,687

(22) Filed: Jul. 2, 2009

(65) Prior Publication Data

US 2011/0001854 A1 Jan. 6, 2011

(51) Int. Cl.
*H04N 9/64* (2006.01)
*H04N 5/235* (2006.01)
*H04N 5/217* (2011.01)

(52) U.S. Cl. .................. 348/251; 348/229.1; 348/230.1; 348/241

(58) Field of Classification Search ............. 348/207.99, 348/221.1, 223.1, 224.1, 229.1, 230.1, 234, 348/241, 251, 254, 255
See application file for complete search history.

(56) References Cited

U.S. PATENT DOCUMENTS

| | | | | |
|---|---|---|---|---|
| 7,834,921 | B1* | 11/2010 | Pinto et al. | 348/251 |
| 2002/0135688 | A1* | 9/2002 | Niikawa | 348/251 |
| 2006/0132627 | A1* | 6/2006 | Ikuta | 348/252 |
| 2008/0278613 | A1* | 11/2008 | Hunter et al. | 348/308 |
| 2009/0051792 | A1* | 2/2009 | Arimoto et al. | 348/251 |

* cited by examiner

*Primary Examiner* — David Ometz
*Assistant Examiner* — Peter Chon
(74) *Attorney, Agent, or Firm* — Hahn Moodley LLP; Vani Moodley, Esq.

(57) ABSTRACT

In one embodiment of the invention, there is provided a method of correcting a captured image for lens shading artifacts, the captured image being captured by an image capture system, the method comprising: determining a function L(x, y) being a lens shading correction function to be applied to images captured by a lens of the image capture system in order to correct for lens shading artifacts; if a focal length associated with the captured image is less than a focal length associated with, the function L(x, y) then cropping the function L(x, y) based on the focal length associated with the captured image; and scaling the cropped function L(x, y) to a size of the tin-cropped Junction L(x, y).

14 Claims, 10 Drawing Sheets

LENS SHADING CORRECTION FOR AUTOFOCUS AND ZOOM LENSES

FIELD

Embodiments of the invention relate to a method and system to correct an image for artifacts due to leas shading.

BACKGROUND OF THE INVENTION

FIG. 1 of the drawings shows a typical image capturing system comprising a lens system 100 and a sensor (or film) 102 to capture an image illuminated by a light source 104.

In image capturing systems involving the lenses such as the one shown in FIG. 1 of the drawings, the light distribution by the lens system is non-uniform, causing a captured image to have some light intensity fall-off toward the edges of the image. This artifact is called the lens shading artifact or vignette.

FIG. 2 of the drawings illustrates the effect of the lens shading artifact on a captured image. Referring to FIG. 2, it will be seen that a captured image 200 includes a central circular region 202 where the light intensity is the brightest. The light intensity falls off radially away from the center region 202. Edges 204 at the corners at the image 200 show the greatest fell off in light intensity.

The lens shading artifact may be removed by multiplying the light intensity I(x, y) at the image location (x, y) by a lens shading correction amount L(x, y)

$$I_{corrected}(x,y) = I(x,y) \times L(x,y)$$

In reality, for image capturing systems that include an image sensor, the sensor might contribute offset terms that would make the Equation (1) more complex. The offset terms are not considered so as not to obscure the invention. However, one skilled in the art will know how to modify Equation (1) with the offset terms.

The lens shading artifact may be modeled and the function L(x, y) may be computed from the model. Because the function L(x, y) is a two-dimensional (2D) function with two variables x and y, its model tends to be complicated and expensive to implement in hardware.

SUMMARY

In one embodiment of the invention, there is provided a method of correcting a captured image for lens shading-artifacts, the captured image being captured by an image capture system, the method comprising: determining a function L(x, y) being a lens shading correction function to be applied to images captured by a lens of the image capture system in order to correct for lens shading artifacts; if a focal length associated with the captured image is less than a focal length associated with the function L(x, y) then cropping the function L(x, y) based on the focal length associated with the captured image; and scaling the cropped function L(x, y) to a size of the on-cropped function L(x, y).

In another embodiment of the invention there is provided an image processor, comprising; lens shading correction logic to execute a method of correcting a captured image for lens shading artifacts, the captured image being captured by an image capture system, the method comprising: determining a function L(x, y) being a lens shading correction function to be applied to images captured by a lens of the image capture system in order to correct for lens shading artifacts; if a focal length, associated, with the captured image is less than a focal length associated, with the function L(x, y), then cropping the function L(x, y) based on the focal length associated with the captured image; and scaling the cropped function L(x, y) to a size of the un-cropped function L(x, y).

In yet another embodiment of the invention there is provided an image capture system, comprising: camera optics; an image sensor; and an image processor to process an image captured by the image sensor using the camera optics, the image processor comprising: lens shading correction logic to execute a method of correcting a captured image for lens shading artifacts, the captured image being captured by an image capture system, the method comprising: determining a function L(x, y) being a lens shading correction function to be applied to images captured by a lens of the image capture system in order to correct for lens shading artifacts; if a focal length associated with the captured image is less than a focal length associated with, the function L(x, y) then cropping the captured image based on the focal length associated with the captured image; and scaling the cropped image to a foil sized image.

DETAILED DESCRIPTION

In the following description, for purposes of explanation, numerous specific details are set forth, in order to provide a thorough understanding of the invention, it will be apparent, however, to one skilled in the art that the invention can be practiced without these specific details, in other instances, structures and devices are shown only in block diagram form in order to avoid obscuring the invention.

Reference in this specification to "one embodiment" or "an embodiment" means that a particular feature, structure, or characteristic described in connection with the embodiment is included in at least one embodiment of the invention. The appearance of the phrases "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In one embodiment, the present, invention disclose a method of correcting for lens shading artifacts in a captured image based on a two-dimensional (2D) lens shading correction function for the lens used to capture the image.

The method will be described with reference to FIG. 1 of the drawings.

Figure 1:
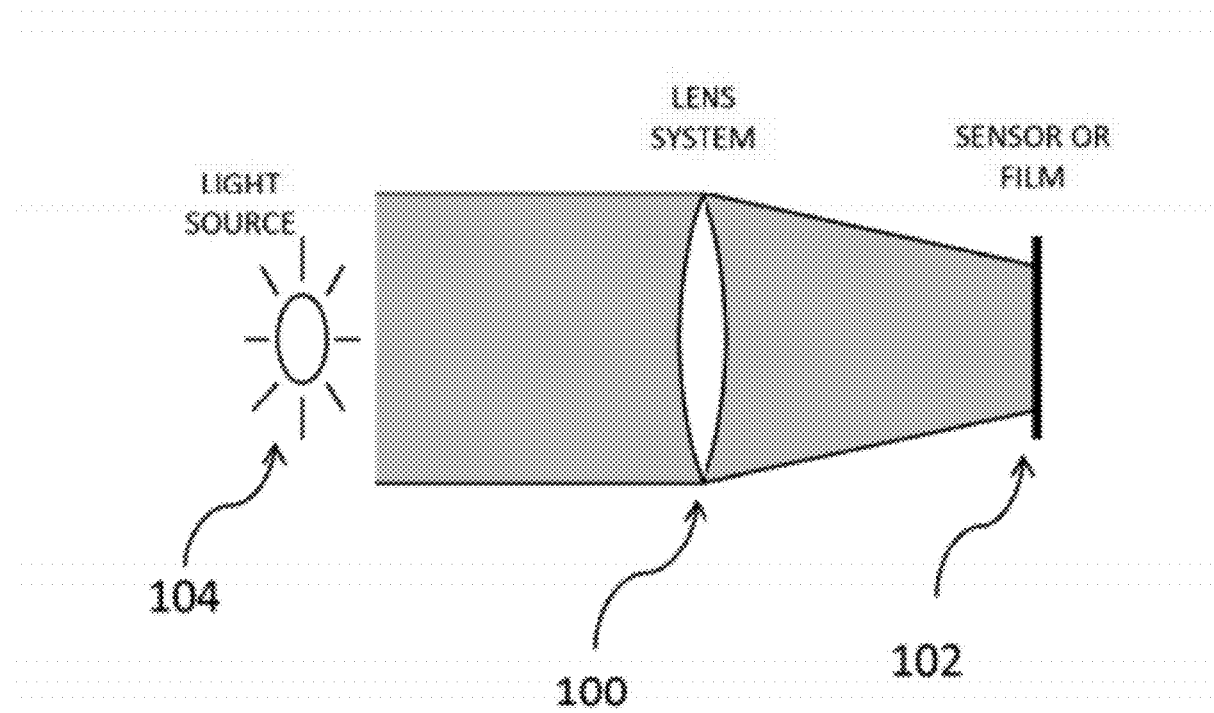
FIG. 1 shows an image capturing system.
Figure 2:
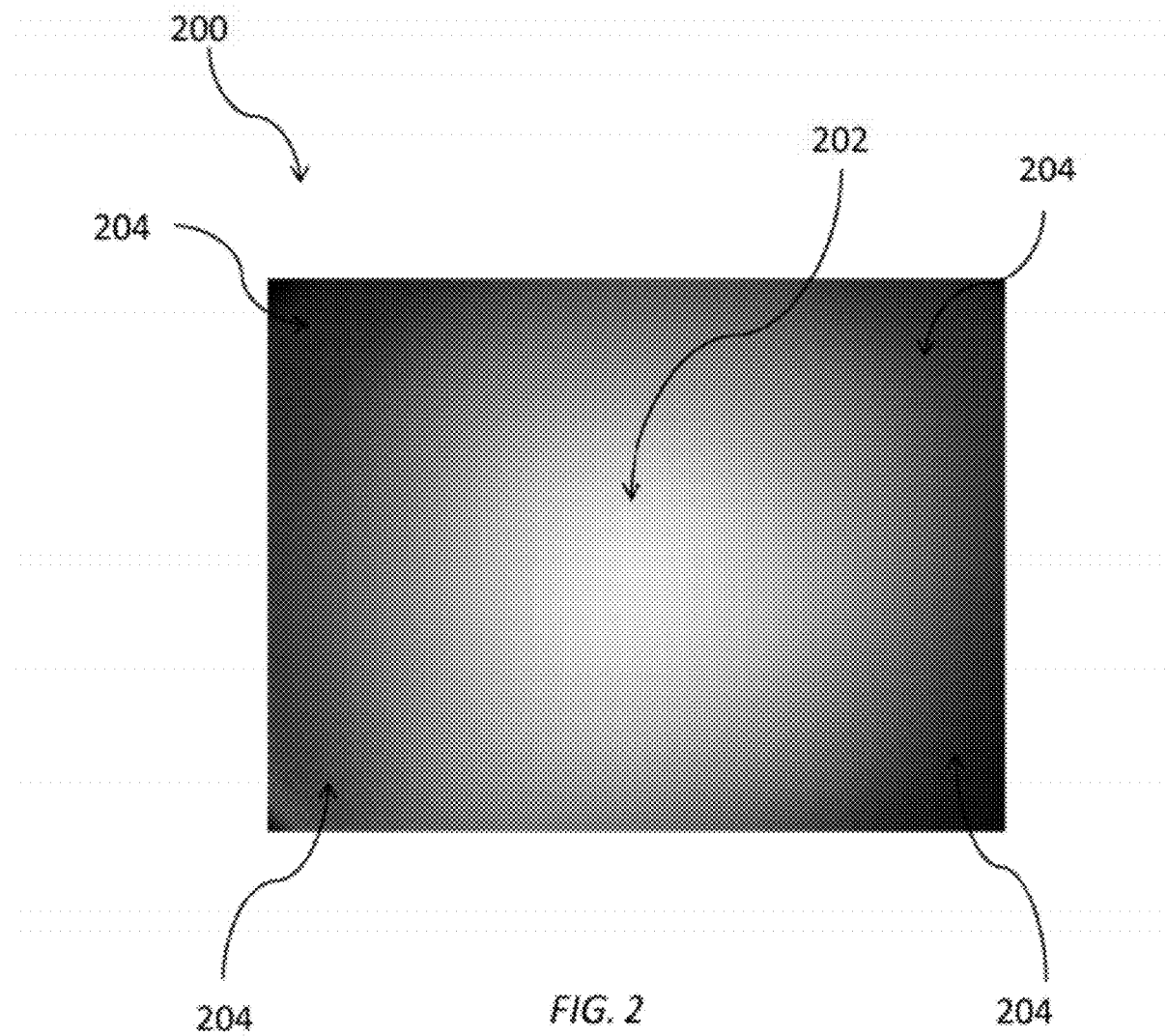
FIG. 2 illustrates the lens shading effect.

Referring to FIG. 1, there is shown a camera system 300 in accordance with one embodiment of the invention. The camera system 300 includes camera optics 302 coupled to an image sensor 304. The image sensor 304 captures images through a lens 303 of the camera optics 302 and stores the images in an image boiler 306. Image processor 308 processes images captured by the image sensor 304. The image processor 308 includes lens shading correction logic 310. The camera system 300 has been greatly simplified by leaving out a great many components so as not to obscure the present invention. However, one of ordinary skill in the art would understand these components to form the camera system 300.

It is to be understood that the camera system 300 is representative of any device that includes a camera capable of capturing images. Thus, digital cameras, camera-equipped mobile phones, etc. would be representative examples the camera system 300.

The lens shading correction logic 310 comprises the logic required to perform the method. In accordance with embodiments of the invention, the lens shading correction logic 310 may be implemented in software, hardware, or a combination of both software and hardware.

Figure 3A:
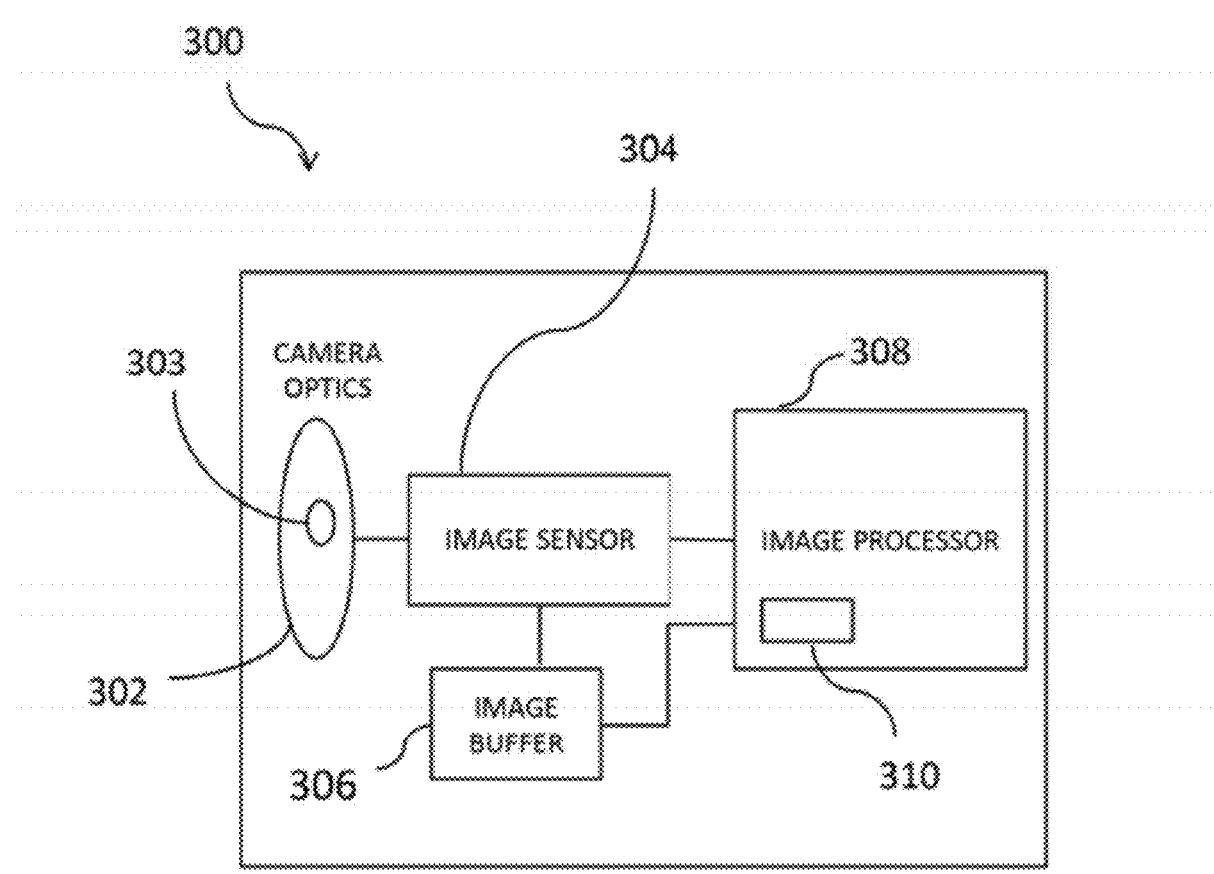
FIG. 3A shows a high-level block of an imaging system comprising an image processor that includes lens shading correction logic in accordance with one embodiment of the invention.
Figure 3B:
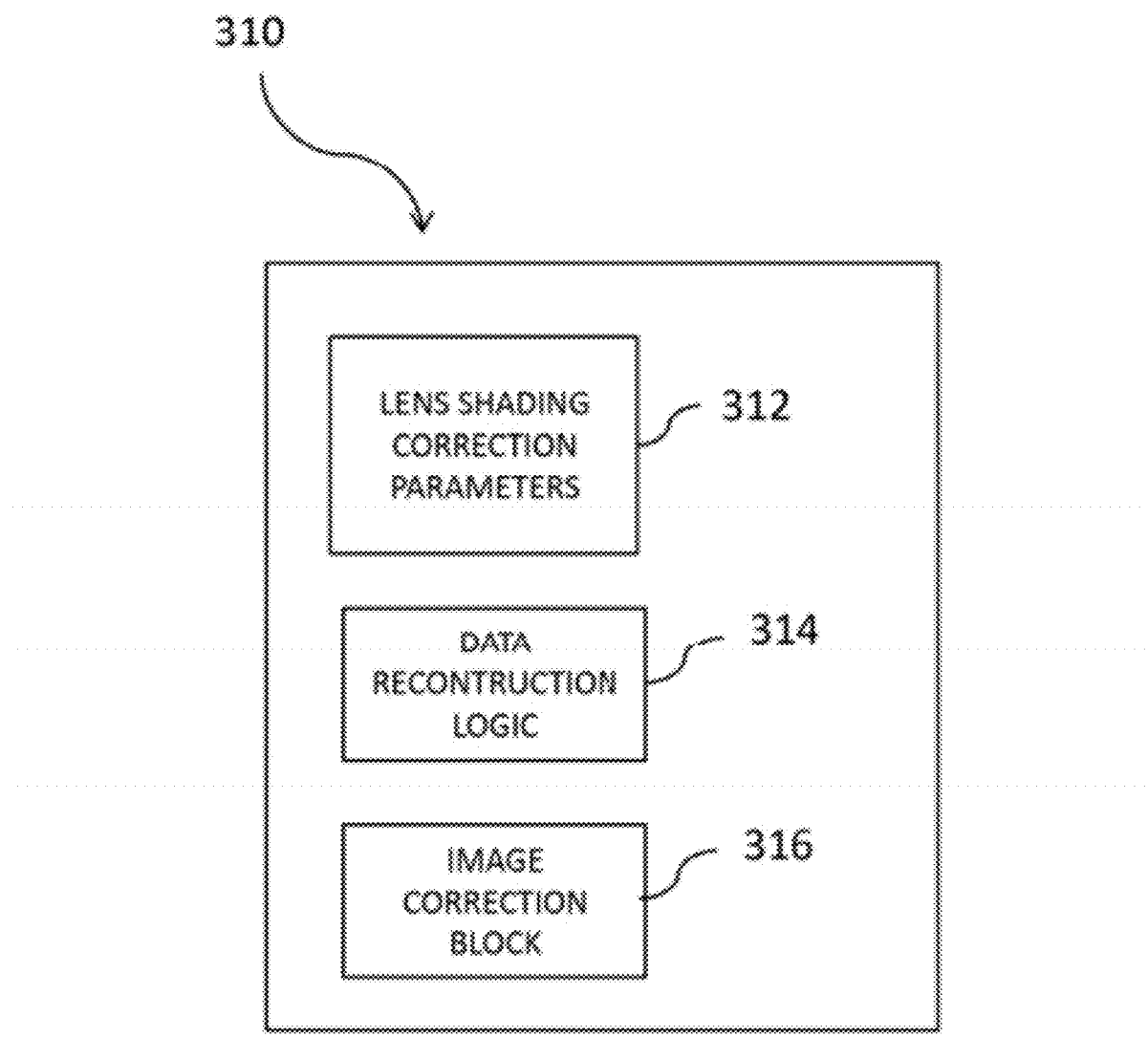
FIG. 3B shows a block diagram of the components the lens shading correction logic of FIG. 3A.

Referring to FIG. 3, in one embodiment the lens shading correction logic 310 includes lens shading correction parameters 312, data reconstruction logic 314, and an image correction block 316. The function and operation of these components will be clear from the description below.

The method comprises the following broad steps: construct the surface for the function, L(x, y), subsample the surface to build a two-dimensional (2D) table, and reconstruct the function L(x, y) from the table data.

1. Construct L(x, y)

In accordance with one embodiment of the invention, in order to construct the surface L(x, y), a uniform white or gray image is captured through the lens whose lens shading surface L(x, y) is to be determined, i.e. the lens 303 of the system 300. If the captured image is I(x, y) then based on equation (1):

$$L(x, y) = \frac{I_{corrected}(x, y)}{I(x, y)} \quad (2)$$

The image data captured at the center of the lens 303 does not have the lens shading artifact. Thus, in one embodiment, the corrected image is normalized to the brightness of image data captured through, the center of the lens 303.

In one embodiment the brightest spot in the captured image is deemed to have been captured through the center of the lens, so $$I_{corrected}(x,y) = \text{Max}(I(x,y)) \quad (3)$$

Combining (3) and (2), yields the following equation:

$$L(x, y) = \frac{\text{Max}(I(x, y))}{I(x, y)} \quad (4)$$

In one embodiment, to improve the data for L(x, y), the image data I(x, y) may be computed as an average over multiple image captures. On the final I(x, y), a local smoothing filter such as moving average or curve fitting may be used to improve the data.

Figure 4:
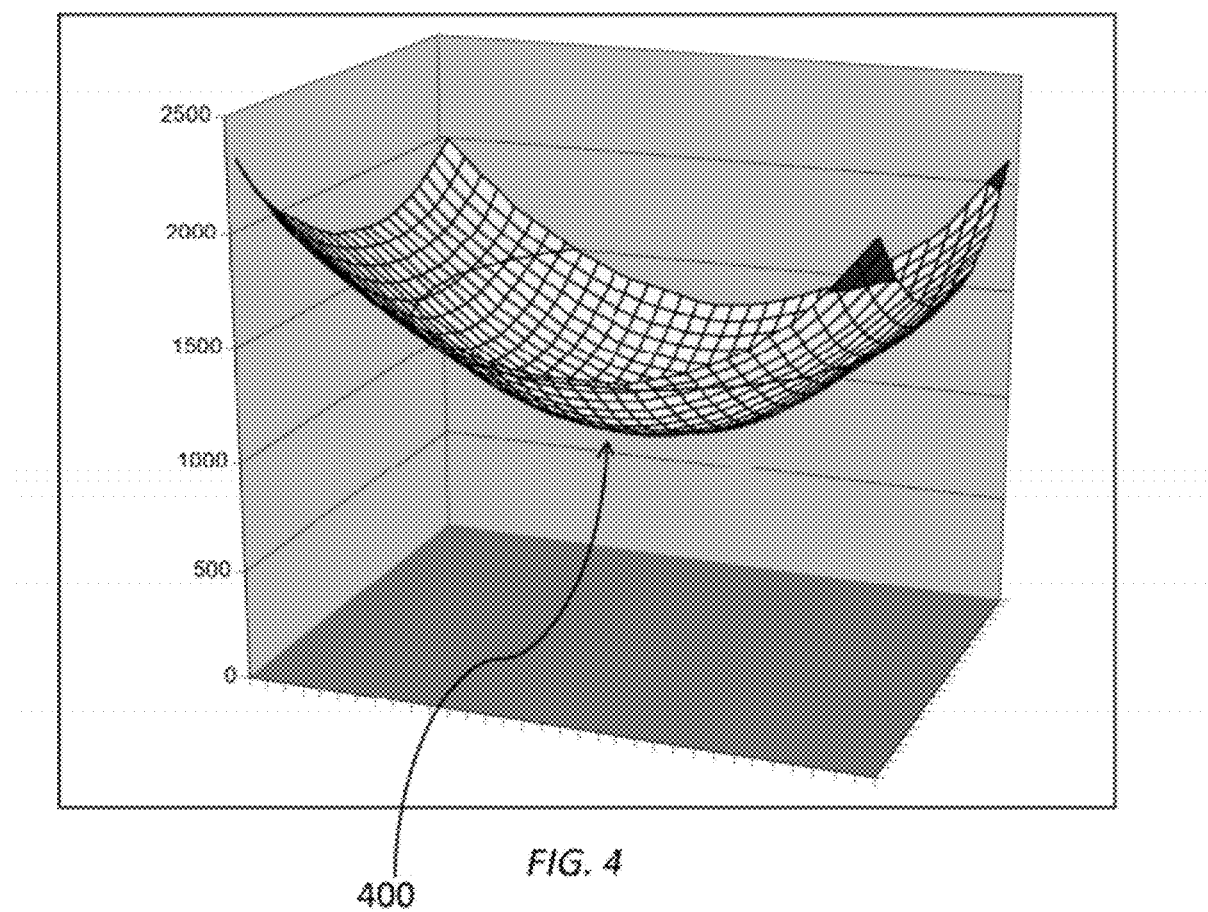
FIG. 4 shows a lens shading correction function L(x, y) for the image capturing system of FIG. 1.

Referring to FIG. 4 of the drawings, reference numeral 400 shows surface L(x, y) constructed for the lens 303, in accordance with embodiment of the invention.

2. Build 2D Table

If an image to be corrected has width W and height H, then the camera system 300 must store W×H points of data for the lens shading correction function L(x, y). For example, if the system 300 were a three megapixel camera then the system 300 would be required to store 3 million data points in its memory.

In one embodiment the method of the present invention advantageously eats down on the data points that the system 300 would need to store in memory for the function L(x, y) in order to correct an image for the lens shading artifact.

The method includes building a 2D table of data points of the function L(x, y). In building the table most of the data for the function L(x, y) is discarded while only a few sample points for the function L(x, y) are kept. In one embodiment, the missing data for the function L(x, y) corresponding to the discarded data points may be calculated based on the stored data points, thus effectively reconstructing the lens shading correction function L(x, y). The calculation of the missing data is performed by the lens shading correction logic 310 at the time of processing a captured image.

Since the function L(x, y) for most lenses is very smooth, in reality, more than 99.9% of the data points for the function L(x, y) may be discarded.

To build the 2D table, in one embodiment data for the function L(x, y) is sampled and stored in a memory as the lens shading correction parameters 312 of the system 300. The non-sampled data is discarded. The sampling points are chosen carefully so that the missing data can foe reconstructed with minimum errors.

The invention is not limited to any particular sampling method. In one embodiment, the sample points are fixed and equally spaced. For this type of sampling more storage but less processing power would be required. On the other hand, a variable sample points would take less storage but might need a lot of processing power.

Figure 5:
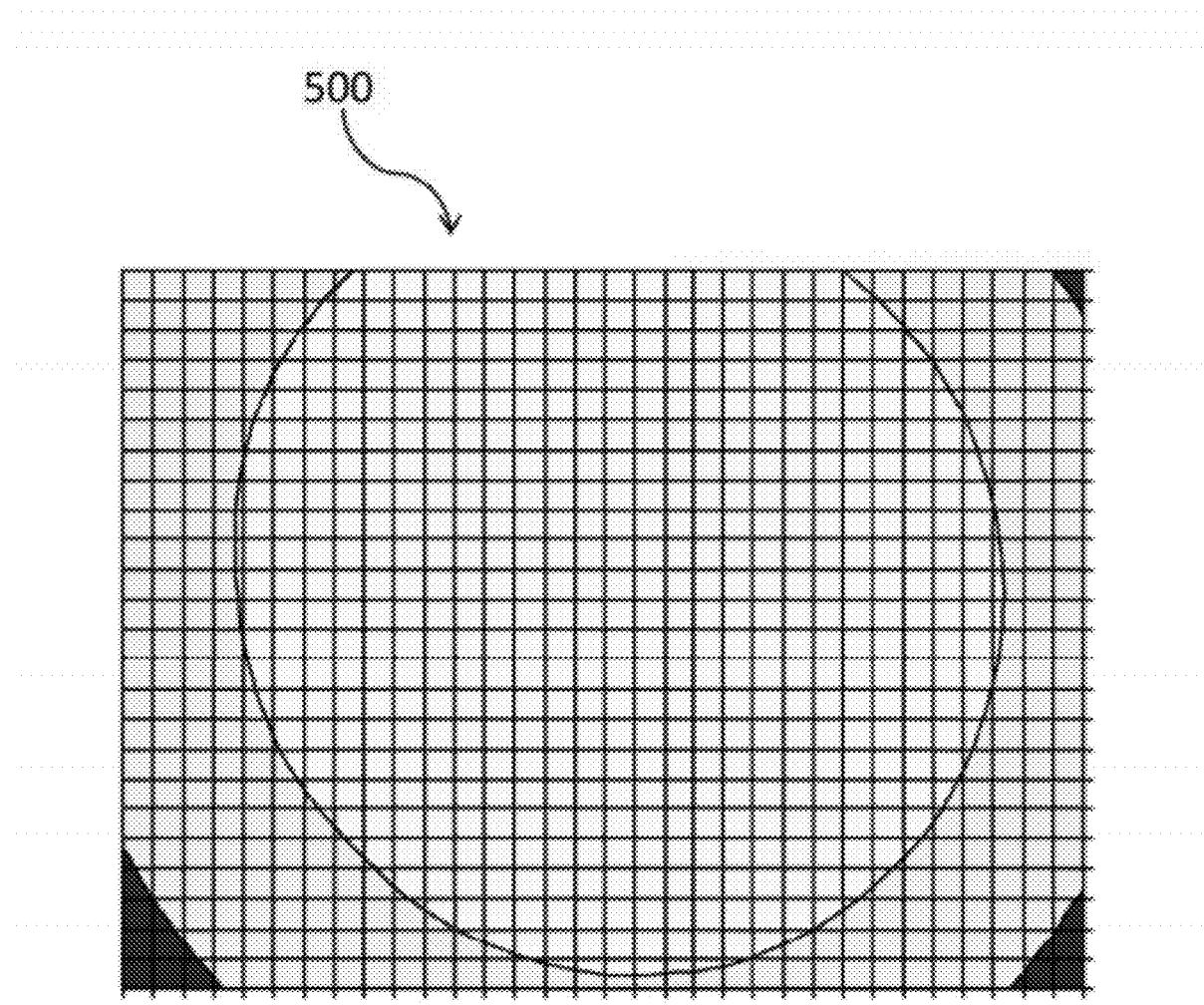
FIG. 5 illustrates a uniform sampling grid used to sample the lens shading correction function L(x, y), in accordance with one embodiment of the invention.

FIG. 5 illustrates a uniform sampling grid 500 used to sample the lens shading correction function L(x, y), in accordance with one embodiment of the invention.

The fixed and equally spaced sample points are located at the grid intersections.

Figure 6:
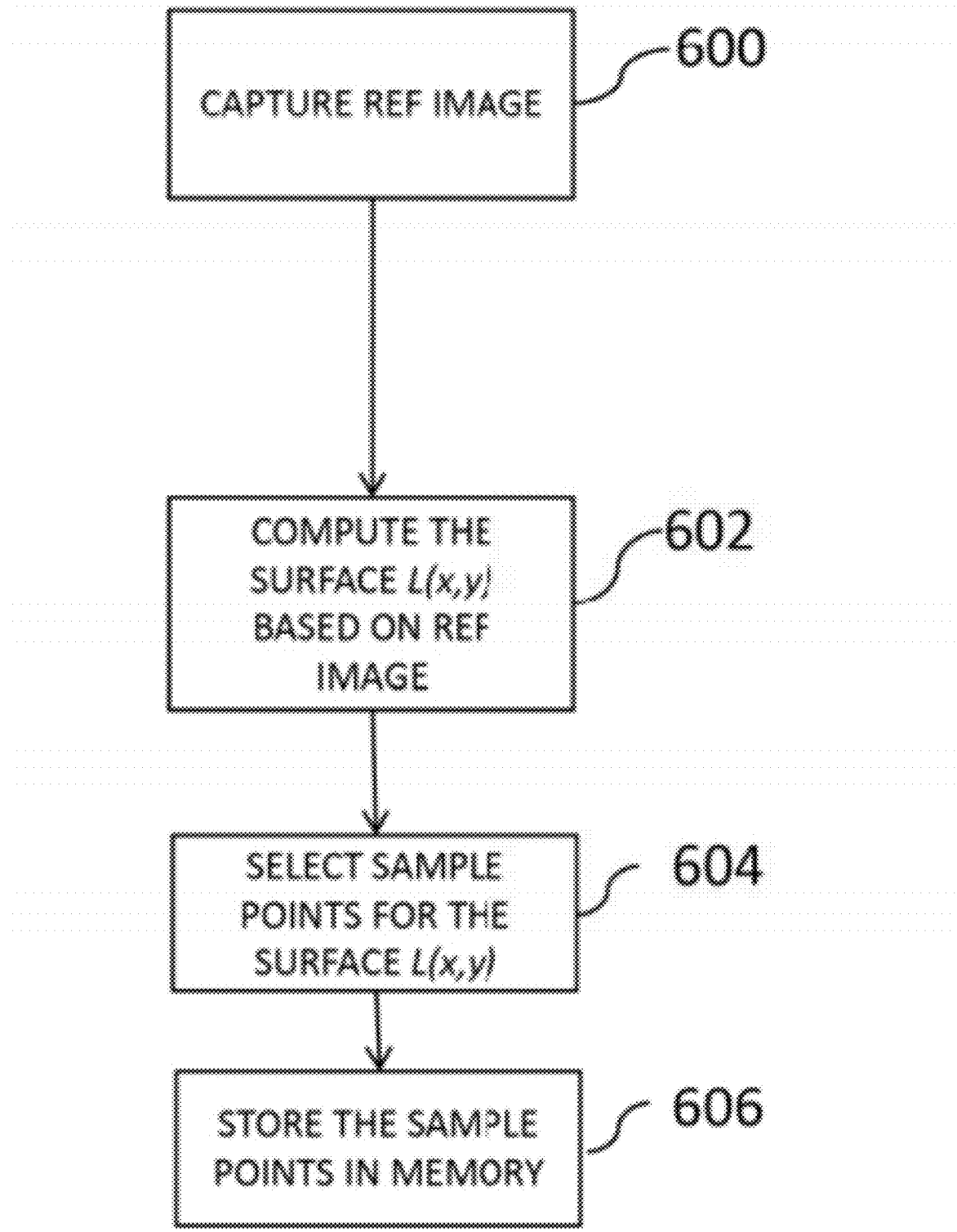
FIG. 6 shows a flowchart of operations performed to generate sample points corresponding to the lens shading correction function L(x, y) of FIG. 4, in accordance with one embodiment of the invention.

FIG. 6 of the drawings shows the operations performed in determining L(x, y) building the 2D table, in accordance with one embodiment. Referring to FIG. 5, at block 600 a reference image is captured using the lens 303. As noted above, in some embodiments more than one reference image may be captured and the multiple images then averaged and soothed into a single reference image.

At block 602, the function/surface L(x, y) is computed for the lens 303. At block 604 a sampling operation is performed in order to select samples points for the function L(x, y). At block 606, the selected sample points are stored in memory as the parameters 312, 3. Reconstruct L(x, y)

The function of the data reconstruction logic 310 is to reconstruct the missing data for the lens shading correction function L(x, y). In one embodiment the data reconstruction logic 310 implements interpolation methods for this purpose. Since the lens shading surfaces are very smooth, in one embodiment, bilinear or bicubic interpolation may used for the reconstruction.

Figure 7:
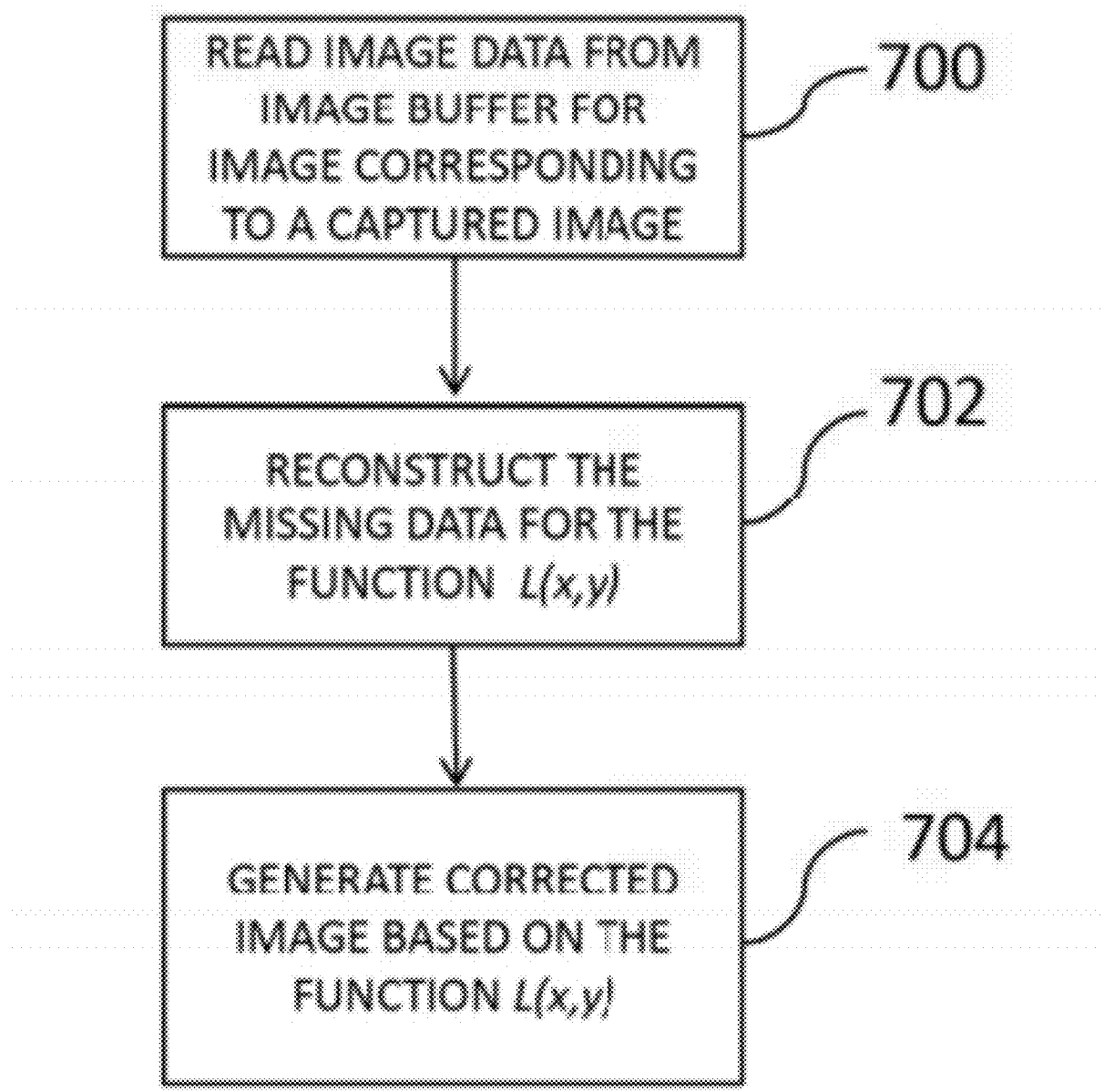
FIG. 7 shows a flowchart of operations to correct a captured image for the lens shading artifact based on the lens shading correction, function L(x, y), in accordance with one embodiment of the invention.

FIG. 7 shows a flowchart of operations to correct a captured image for the lens shading artifact based on the lens shading correction function L(x, y), in accordance with one embodiment of the invention. Referring to FIG. 7, at block 700 image data is read from the image buffer 306. The image data corresponds to the captured image.

At block 702, the missing data for the function L(x, y) is reconstructed using data reconstruction logic 314. At block 704, a corrected image is generated based on the function L(x, y). The block 704 is performed by the image correction block 316.

Autofocus and Zoom Lenses

Embodiments of the invention disclose how to correct for lens shading artifacts in cases where the camera optics 302 comprises auto focus and zoom lenses, as will now be described.

When the camera system 300 changes its focus, the lens 303 moves closer or away from the the image sensor 304. This causes different areas of the lens 303 to be captured on an image, depending on the distance of the lens 303 from the image sensor 304.

Figure 8:
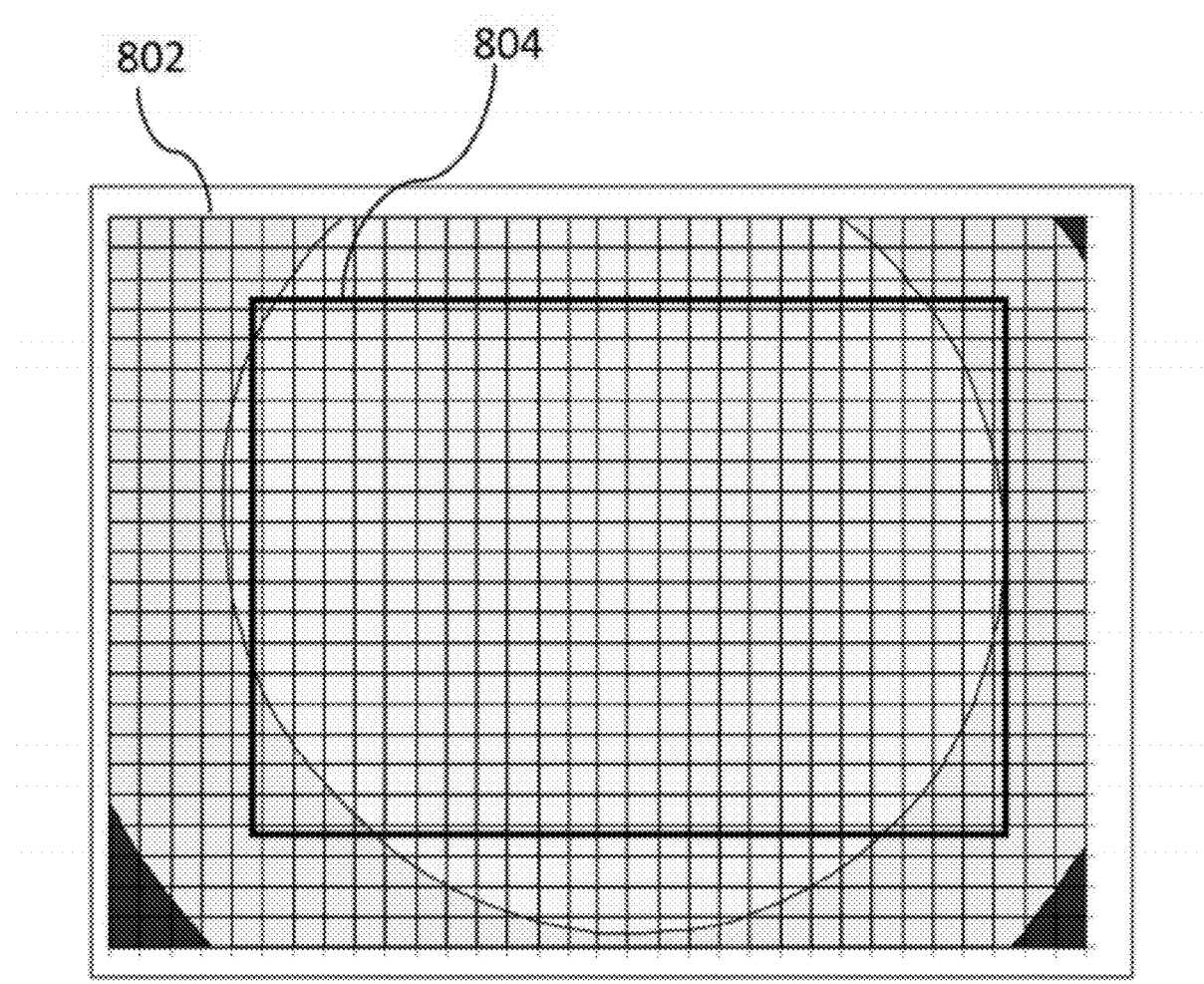
FIG. 8 illustrates how the relative position of a lens and image sensor affects the portion of the lens uses for image capture.

FIG. 8 of the drawings illustrate how the capture area of the lens 303 changes with its focal length. Referring to FIG. 8, when there is no zoom and the lens 303 is furthest from the image sensor 304, images are captured with the widest view angle and the entire area of the lens 303 is used to capture the images. This entire area is indicated by reference numeral 802. For images captured with zoom, the area of the lens 303 used for the captures is smaller than the entire area 802. The portion of the lens 303 used when there is zoom is indicated by reference numeral 804 in FIG. 8.

If the image data I(x, y) are captured when the lens 303 is furthest from the image sensor 304, then reconstructing the lens shading surface L(x, y) for any focus positions requires the cropping and scaling of the original lens shading surface L(x, y), as will now be described.

In one embodiment, for autofocus and zoom lenses, the Junction L(x, y) is calculated for the widest view angle of the lens 303. In other words the function L(x, y) is calculated with the lens 303 is furthest from the images sensor 304.

To perform the lens shading correction at any focus position or focal length, the the original function L(x, y) is first, cropped and scaled before it is applied by the image correction block in the manner described.

Figure 9:
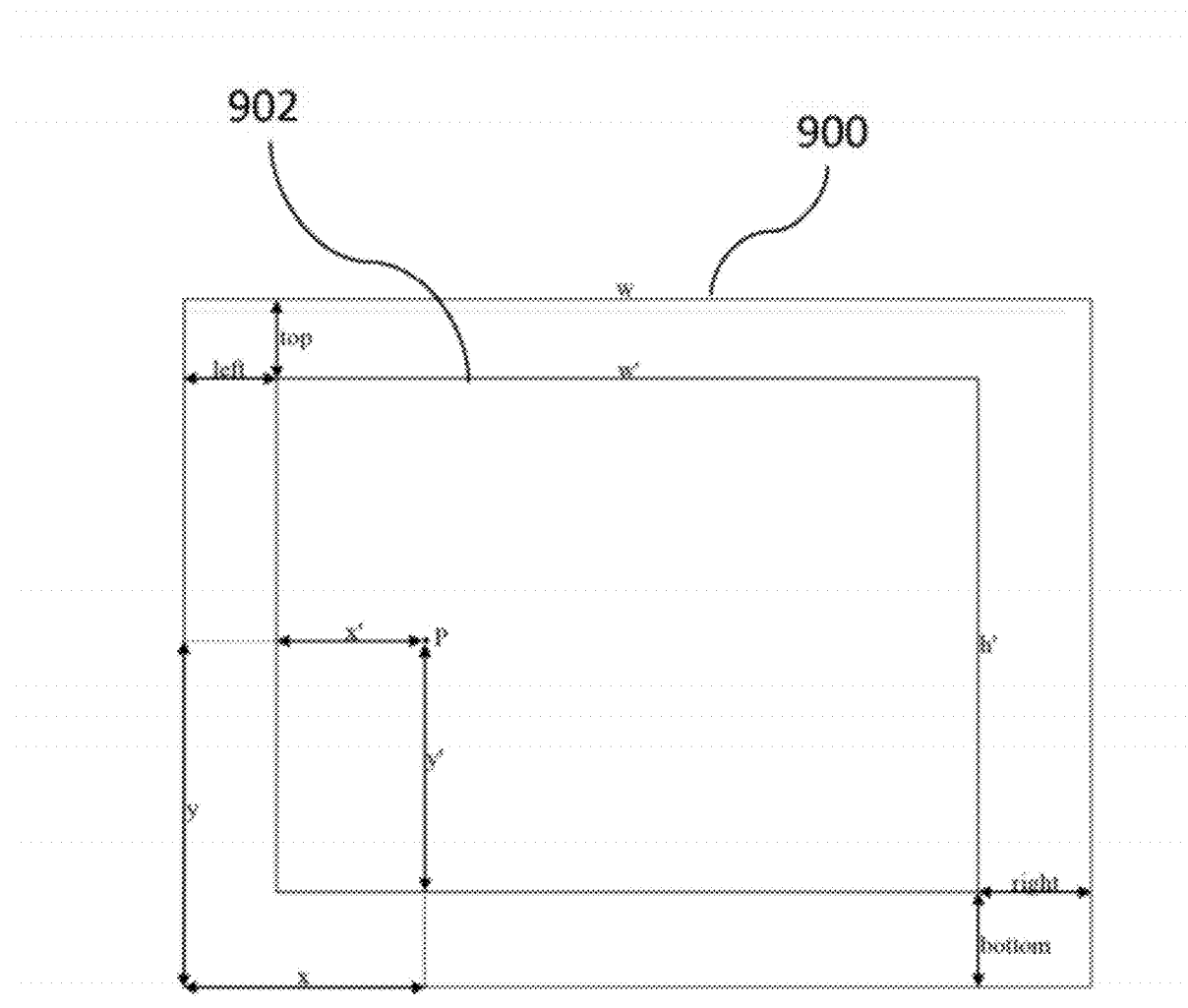
FIG. 9 illustrates coordinate systems for images captured with and without zoom.

The cropping and scaling operation will now be described with reference to FIG. 9 of the drawings. In FIG. 9, reference numeral 900 represents an image captured when the lens 303 is at its widest view angle. Reference numeral 902 represents an image captured with zoom.

Using the Cartesian coordinate system, the image 900 has its origin at its lower left corner and has units of one image pixel For ease of reference the coordinate system for the image 900 will be referred to as the "900 coordinate system". The image 902, using the Cartesian coordinate system, has its origin at its lower left corner and a unit of one image pixel. For ease of reference the coordinate system for the image 902 will be referred to as the "902 coordinate system".

The labels in FIG. 9 have the following meanings
left=distance between the left edges of the images in the 900 coordinate system
top=distance between the top edges of the images in the 900 coordinate system
right=distance between the right edges of the images in the 900 coordinate system
bottom=distance between the bottom edges of images in the 900 coordinate system
w=width of the image 900 in the 900 coordinate system,
w'=width of the image 902 in the 900 coordinate system
h=height of the image 900 in the 900 coordinate system
h'=height of the image 902 in the 900 coordinate system x=x-coordinate of the pixel P in the 900 coordinate system
x'=x-coordinate of the pixel P in the 902 coordinate system
y=y-coordinate of the pixel P in the 900 coordinate system
y'=y-coordinate of the pixel P in the 902 coordinate system Let L(x, y) be the lens shading correction function for the image 900 and L'(x', y') be the lens shading correction function for the image 902. To find the relationship between L(x, y) and L'(x', y'), pixel location (x', y') in the 902 coordinate system is converted or mapped to the pixel location (x, y) in the 900 coordinate system. Since both images have the same number of pixels in both horizontal and vertical directions, one pixel of the image 902 in the 902 coordinate system will have the width of w'/w units and the height of h'/h units in the 900 coordinate system. Thus, a length of x' units in the 902 coordinate system equals x'w'/w units in the 900 coordinate system, so the x-coordinate of the pixel P in the 900 coordinate system is $$x = \frac{x'w'}{w} + \text{left} \quad (5)$$

or $$x = \frac{x' \times (w - \text{left} - \text{right})}{w} + \text{left} \quad (6)$$

Similarly, the y-coordinate of the pixel P in the 900 coordinate system is $$y = \frac{y'h'}{h} + \text{top} \quad (7)$$

or $$y = \frac{y' \times (h - \text{top} - \text{bottom})}{h} + \text{top} \quad (8)$$

Therefore, $$L'(x', y') = L\left(\frac{x' \times (w - \text{left} - \text{right})}{w} + \text{left}, \frac{y' \times (h - \text{top} - \text{bottom})}{h} + \text{top}\right) \quad (9)$$

The Equation (6) shows how to crop and scale the x-coordinate x' of a pixel in the image 902 (the image to be corrected for lens shading) into the x-coordinate x of the same pixel in the image 900 (the original image for which the lens shading correction function L(x, y) was constructed). The Equation (8) shows how to crop and scale the y-coordinate y' of a pixel, in the image 902 into the y coordinate y of the same pixel in the image 900. Finally, the Equation (9) shows how to derive the lens shading correction function L'(x', y') from the original leas shading function L(x, y) by cropping and scaling the x, and y coordinates of the pixel in the image to be corrected for lens shading into the x and y coordinates of the pixel in the original image. The scaling operation can be thought of as mapping each pixel in the cropped image to a corresponding pixel in a full sized or un-cropped image so that, the original function L(x, y) may be applied.

Due to the division in the Equation (6), x might not be an integer. Similarly, y might not be an integer either. Therefore, the point (x, y) might not fall exactly on the pixel grid in the original image. For the lens shading correction algorithms that model the function L(x, y) as a continuous 2D surface, this is not an issue. For other algorithms, interpolation is performed to derive the lens shading correction values for pixels in the captured image surrounding the point (x, y) to get the correction value for that point. Any interpolation method may be used.

For the table-based lens shading correction algorithms that keep some sampling points of the function L(x, y) in the storage then reconstructs the whole function L(x, y) from the sampling points via interpolation, the same interpolation method may used in the cropping and scaling operations.

The cropping and scaling technique described herein may uses in any camera system that has auto focus or mom functions regardless of the particular algorithm uses to determine the correction values corresponding to the function L(x, y). Thus, for example the cropping and scaling technique may be used with a system that uses a one-dimensional lens shading correction, such as is described in U.S. Pat. No. 7,561,306. The technique also works in the case of an image capture system with digital, zoom.

Although the present invention has been described with reference to specific example embodiments, it will, be evident that, various modifications and changes can be made to these embodiments without departing from the broader spirit of the invention. Accordingly, the specification and drawings are to be regarded in an illustrative sense rather than in a restrictive sense.

The invention claimed is:

1. A method of correcting a captured image for lens shading artifacts, the captured image being captured by an image capture system, the method comprising:
   determining a function L(x, y) being a lens shading correction function to be applied to images captured by a lens of the image capture system in order to correct for lens shading artifacts;
   if a focal length associated with the captured image is greater than a focal length associated with the function L(x, y) then cropping the function L(x, y) based, on the focal length associated with the captured image; and scaling the cropped function L(x, y) to a size of the un-cropped function L(x, y);
   wherein the scaling comprises mapping each data point in the cropped function L(x, y) to a corresponding data point in the un-cropped function L(x, y).

2. The method of claim 1, wherein the function L(x,y) is determined based on a reference image captured at a widest angle supported by the image capture system.

3. The method of claim 1, wherein determining the function L(x,y) comprises reading sample data points for the function L(x,y) from memory.

4. The method of claim 1, wherein determining the function L(x,y) further comprises deriving missing data points for the function L(x,y) based on interpolation, after scaling.

5. The method of claim 4, wherein a data point of the function L(x, y) is deemed to be missing if a pixel in the function L(x, y) after cropping and scaling falls between sample points for the function L(x, y).

6. The method of claim 1, further comprising correcting an intensity associated with each pixel in the captured image based on the function L(x, y).

7. The method of claim 1, further comprising correcting an intensity associated with each pixel in the full sized image based on the function L(x, y).

8. An image processor, comprising:
   lens shading correction logic to execute a method of correcting a captured image for lens shading artifacts, the captured image being captured by an image capture system, the method comprising;
   determining a function L(x, y) being a lens shading correction function to be applied to images captured by a lens of the image capture system in order to correct for lens shading artifacts;
   if a focal length associated with, the captured image is greater than a focal length associated with the function L(x, y), then cropping the function L(x, y) based on the focal length associated with the captured image; and scaling the cropped function L(x, y) to a size of the un-cropped function L(x, y)
   wherein the scaling comprises mapping each data point in the cropped function L(x, y) to a corresponding data point in the un-cropped function L(x, y).

9. The image processor of claim 8, wherein the function L(x,y) is determined based on a reference image captured at a widest angle supported by the image capture system.

10. An image capture system, comprising;
    camera optics;
    an image sensor; and
    an image processor to process an Image captured by the image sensor using the camera optics, the image processor comprising:
    lens shading correction logic to execute a method of correcting a captured image for lens shading artifacts, the captured image being captured by an image capture system, the method comprising:
    determining a function L(x, y) being a lens shading correction function to be applied to images captured by a lens of the image capture system in order to correct for lens shading artifacts;
    if a focal length associated with the captured image is greater than a focal length associated with the function L(x, y) then cropping the captured image based on the focal length associated with the captured image; and scaling the cropped image to a full sized image
    wherein the scaling comprises mapping each data point in the cropped function L(x, y) to a corresponding data point in the full un-cropped function L(x, y).

11. The image capture system of claim 10, wherein the function L(x, y) is determined based on a reference image captured at a widest angle supported by the image capture system.

12. The image capture system of claim 11, wherein determining the function L(x,y) comprises reading sample data points for the function L(x, y) from memory.

13. The image capture system claim 10, wherein determining the function L(x, y) further comprises deriving missing data points for the function L(x, y) based on interpolation.

14. The image capture system of claim 13, wherein a data point of the function L(x, y) is deemed to be missing if a pixel in the function L(x, y) after cropping and scaling falls between sample points for the function L(x, y).

* * * * *